Patented Aug. 19, 1952

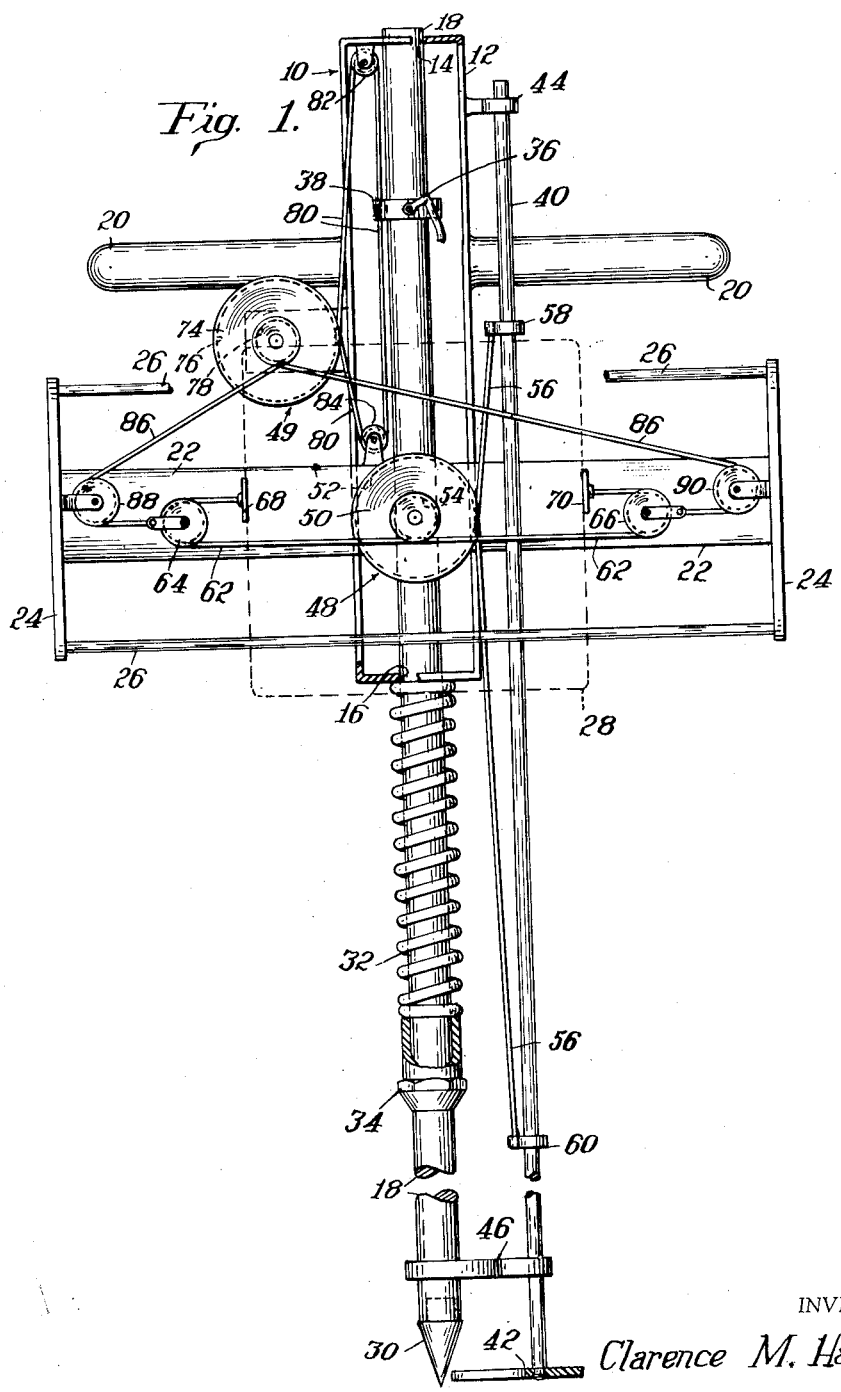

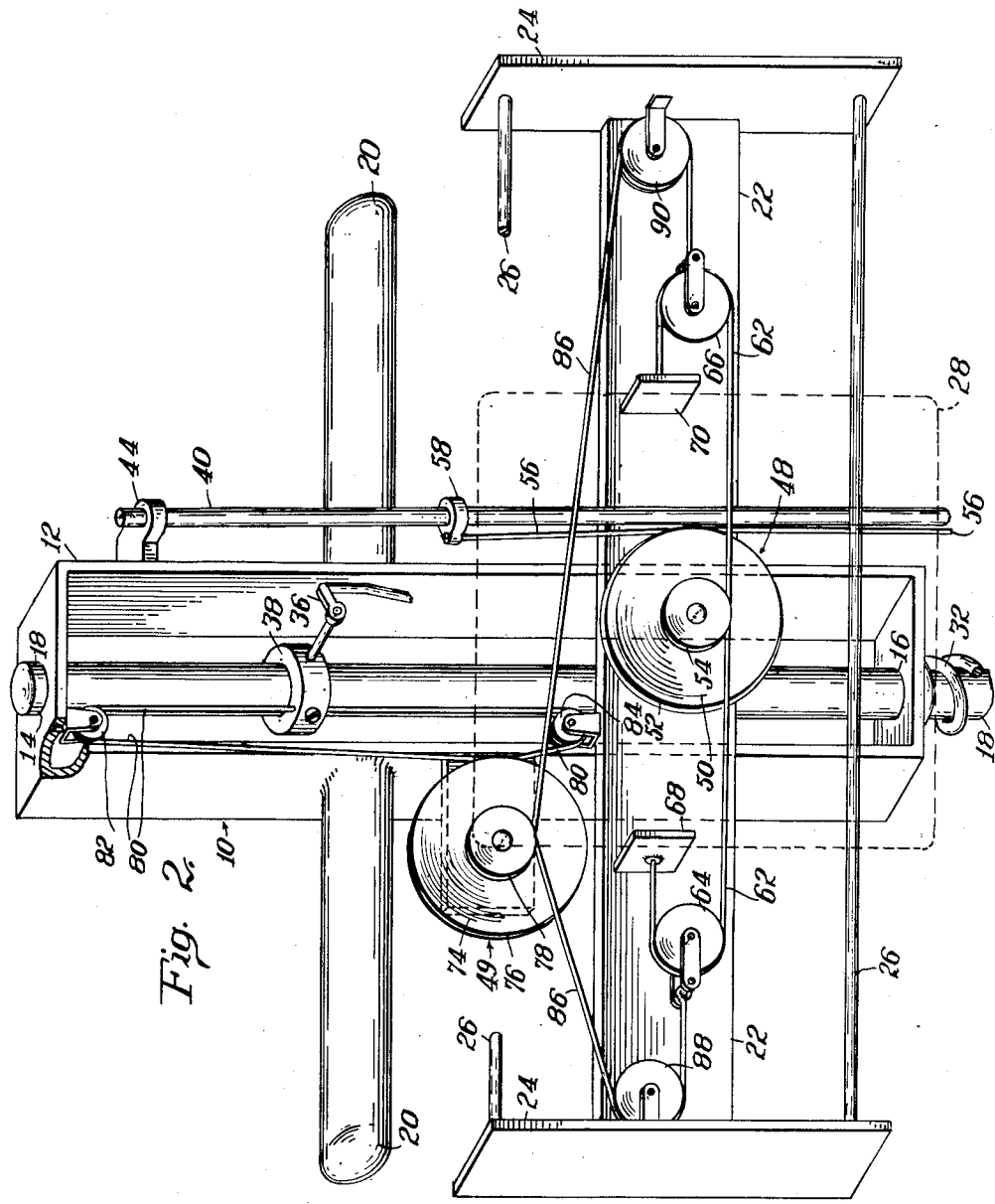

2,607,218

UNITED STATES PATENT OFFICE 2,607,218

PENETROMETER

Clarence M. Hansen, Lansing, Mich., assignor to Research Corporation, New York, N. Y., a corporation of New York Application September 8, 1951, Serial No. 245,710

4 Claims. (Cl. 73—84)

This invention relates to an instrument for determining the physical characteristics of soils and similar substances.

A principal object of the invention is to provide an instrument for measuring the force required to effect the penetration of a probe into soil for varying depths of penetration.

Another object of the invention is to provide such a device for recording variations in the force required for penetration into soil for varying depths of penetration.

A further object is to provide a penetrometer that is compact, light in weight and simple as to its parts whereby it may be readily transported and operated by one man.

Another object of the invention is to provide a recording soil penetrometer that is readily adaptable for use in various soil conditions.

These and other objects and advantages are provided by the recording soil penetrometer of the invention which generally comprises a probe shaft, a frame slidably mounted on the probe shaft, resilient means transmitting to the probe shaft stress applied to the frame, a reference shaft parallel to the probe shaft slidably mounted on the frame, means for recording the force transmitted from the frame to the probe shaft to effect penetration of the probe for varying depths of penetration comprising an indicator member fixed to the probe shaft, a carriage movably secured to the frame carrying a scale in cooperative relation to the indicator member, and drive means connecting the carriage to the reference shaft to move the carriage with respect to the indicator member in response to relative movement of the frame and the reference shaft, said drive means including means for modulating said movement of the carriage in response to relative movement of the frame and the probe shaft.

The invention will be more particularly described with reference to the illustrative embodiments thereof shown in the accompanying drawings in which:

Fig. 1 is a front view of a form of the penetrometer with the card carriage shown in broken lines to more clearly show the carriage operating mechanism, and Fig. 2 is an enlarged detailed perspective view of the frame and the carriage operating mechanism.

Referring to the drawings, 10 is the frame of the penetrometer which comprises a substantially rectangular guide member 12 provided with openings 14 and 16 in its opposite ends for slidably receiving a probe shaft 18. A pair of handles 20 and a carriage support member 22 are secured to the sides of the guide member 12. The ends of the carriage support member 22 are provided with flanges 24 which support cylindrical tracks 26 between their extremities.

A carriage 28, shown in broken lines in the drawings, is slidably mounted on tracks 26 for reciprocatory motion between the flanged ends 24 of support member 22. The face of the carriage may be provided with a scale, or adapted to support a removable card type scale.

Probe shaft 18 in the preferred form of the invention is a cylindrical rod provided with interchangeable probe points 30 for use in soils having different physical characteristics.

A calibrated coil spring 32 is positioned about the lower portion of the probe shaft 18 and engages at one end a ring flange 34 secured to the probe shaft and at the other end the lower end of the guide member 12. Thus the probe shaft is biased in a direction away from the supporting frame 10.

An indicator member 36, of any well known type, is secured to the probe shaft between the ends of the guide member 12 by a clamp ring 38, whereby relative movement between the chart carriage and the probe shaft will be indicated on the face of the carriage or its attached scale.

A reference shaft 40 having a ground engaging foot 42 is slidably secured at its upper end to the frame 10 by means of a bracket 44 and at its lower end by a bracket 46 secured to the probe shaft 18.

It will be seen that when pressure is applied in a downward direction to handles 20 of the frame 10, force is applied to the probe shaft by the coil spring 32 which urges the probe shaft into the soil to be tested, thus while the foot of the reference shaft 40 remains substantially at ground level the frame 10 and probe shaft move downwardly relative thereto. In order to record the depth of penetration of the shaft 18 and the corresponding force, cooperating pulley systems, generally designated 48 and 49, connect the carriage 28 with the reference shaft and the probe shaft whereby the carriage is moved horizontally past the indicator 36 a predetermined increment proportional to the depth of penetration of the probe while at the same time it moves vertically past the indicator a predetermined increment proportional to the relative movement between the carriage and the probe shaft and thereby to the force applied to the probe.

Pulley system 48 generally comprises a pulley 50 having cable grooves 52 and 54 with effective diameters of 3 and 1 attached to the carriage support member 22. A cable 56 loops around pulley groove 52 and has its ends fastened to the reference shaft by clamp rings 58 and 60. A second cable 62 of pulley system 48 is looped around pulley groove 54, and its ends pass through modulating pulleys 64 and 66 and are then fastened to plates 68 and 70 secured to the sides of the carriage 28. Thus as the frame 10 is moved downwardly relative to the reference shaft, carriage 28 is moved to the left with reference to the indicator member 36.

In order to compensate for the compression of spring 32, which may permit relative movement between the frame and the reference shaft without causing the probe shaft to penetrate the soil to be tested, the movement of the carriage 28 by pulley system 48 is modulated by a second pulley system 49.

Pulley system 49 generally comprises a pulley 74 having cable grooves 76 and 78 with effective diameters of 6 to 1 respectively attached to the guide member 12. An endless cable 80 is looped around pulley groove 76, through guide pulleys 82 and 84 and attached to the clamp ring 38 of the probe shaft. A second cable 86 is looped around pulley groove 78, through guide pulleys 88 and 90 and its ends are fastened to the modulating pulleys 64 and 66 respectively. Thus as frame 10 is moved downwardly relative to the probe shaft the movement of the carriage is modulated to compensate for compression of the coil spring 32.

From the foregoing description it will be seen that the present invention provides an improved soil penetrometer whereby the aims, objects and advantages of the invention are fully accomplished. It will be evident, however, that various modifications may be made in the construction of the device and in the form of the carriage driving mechanism. For example, the mechanical reduction of the pulley systems may be of any desired ratio depending on whether larger or smaller charts are desired or the pulley systems may be replaced with any suitable drive mechanism such as solid gearing employing racks and pinions.

It is further contemplated that the coil spring for transmitting force from the frame of the device to the probe shaft may be of any resilient material having a substantially straight line function within the operational range of the device, and that the resilient member may be of the leaf or torsional spring type.

It is further contemplated that soil penetrometers constructed in accordance with the principles of the invention may be provided with a device to indicate or record the speed at which the probe is forced into the soil to be tested whereby more accurate determinations of physical soil conditions may be obtained.

I claim:

1. A penetrometer comprising a probe shaft, a frame slidably mounted on said probe shaft, resilient means transmitting to the probe shaft stress applied to the frame, a reference shaft parallel to the probe shaft slidably mounted on the frame, a ground engaging foot on said reference shaft, means for recording the force transmitted from the frame to the probe shaft to effect penetration of the probe for varying depths of penetration comprising an indicator member fixed to the probe shaft, a carriage movably secured to the frame carrying a scale in cooperative relation to the indicator member, and drive means connecting said carriage to said reference shaft to move the carriage with respect to the indicator member in response to relative movement of the frame and the reference shaft, said drive means including means for modulating the movement of the carriage in response to relative movement of the frame and the probe shaft.

2. A penetrometer comprising a probe shaft, a frame slidably mounted on said probe shaft, resilient means transmitting to the probe shaft stress applied to the frame, a reference shaft parallel to the probe shaft slidably mounted on the frame, a ground engaging foot on said reference shaft, means for recording the force transmitted from the frame to the probe shaft to effect penetration of the probe for varying depths of penetration comprising an indicator member fixed to the probe shaft, a carriage movably secured to the frame carrying a scale in cooperative relation to the indicator member, and drive means for said carriage comprising a first pulley system connecting said carriage to said reference shaft to move the carriage with respect to the indicator member in response to relative movement of the frame and the reference shaft and a second pulley system connecting the first pulley system with the probe shaft for modulating the movement of the carriage in response to relative movement of the frame and the probe shaft.

3. A penetrometer comprising a probe shaft, a frame slidably mounted for vertical reciprocatory movement on said probe shaft, resilient means transmitting to the probe shaft stress applied to the frame, said resilient means comprising a coil spring, one end of said spring engaging the frame and the other end engaging the probe shaft, whereby the probe shaft is urged away from the frame, means for recording the force transmitted from the frame to the probe shaft to effect penetration of the probe for varying depths of penetration comprising a marking member fixed to the probe shaft, a carriage movably secured to the frame carrying a scale in cooperative relation to the marking member, a reference shaft parallel to the probe shaft slidably mounted on the frame, a ground engaging foot on said reference shaft, and drive means connecting said carriage to said reference shaft to move the carriage with respect to the marking member in response to relative movement of the frame and the reference shaft, said drive means including means for modulating the movement of the carriage in response to relative movement of the frame and the probe shaft.

4. A penetrometer comprising a probe shaft, a frame slidably mounted for vertical reciprocatory movement on said probe shaft, resilient means transmitting to the probe shaft stress applied to the frame, said resilient means comprising a coil spring, one end of said spring engaging the frame and the other end engaging the probe shaft, whereby the probe shaft is urged away from the frame, means for recording the force transmitted from the frame to the probe shaft to effect penetration of the probe for varying depths of penetration comprising a marking member fixed to the probe shaft, a carriage movably secured to the frame carrying a scale in cooperative relation to the marking member, a reference shaft parallel to the probe shaft slidably mounted on the frame, a ground engaging foot on said reference shaft, and drive means for said carriage comprising a first pulley system connecting said carriage to said reference shaft to move the carriage with respect to the marking member in response to relative movement of the frame and the reference shaft, and a second pulley system connecting the first pulley system with the probe shaft for modulating the movement of the carriage in response to relative movement of the frame and the probe shaft.

CLARENCE M. HANSEN.

REFERENCES CITED

The following references are of record in the file of this patent:

UNITED STATES PATENTS

| Number | Name | Date |
|---|---|---|
| 1,961,755 | Foster | June 5, 1934 |
| 2,130,751 | Van Der Meer | Sept. 20, 1938 |
| 2,280,966 | Nadai et al. | Apr. 28, 1942 |

FOREIGN PATENTS

| Number | Country | Date |
|---|---|---|
| 575,050 | Germany | Apr. 25, 1933 |